US012742853B2

(12) United States Patent
Dechant et al.

(10) Patent No.: US 12,742,853 B2
(45) Date of Patent: Sep. 22, 2026

(54) CASCADED RADAR SYSTEM

(71) Applicant: Infineon Technologies AG, Neubiberg (DE)

(72) Inventors: Martin Dechant, Graz (AT); Josef Kulmer, Graz (AT); George Efthivoulidis, Graz (AT)

(73) Assignee: Infineon Technologies AG, Neubiberg (DE)

( * ) Notice: Subject to any disclaimer, the term of this patent is extended or adjusted under 35 U.S.C. 154(b) by 302 days.

(21) Appl. No.: 18/422,706

(22) Filed: Jan. 25, 2024

(65) Prior Publication Data

US 2025/0020764 A1 Jan. 16, 2025

(30) Foreign Application Priority Data

Feb. 3, 2023 (DE) ........................ 102023102699.2

(51) Int. Cl.
*G01S 7/03* (2006.01)
*G01S 7/35* (2006.01)

(52) U.S. Cl.
CPC ................ *G01S 7/03* (2013.01); *G01S 7/352* (2013.01)

(58) Field of Classification Search
CPC .................................. G01S 7/03; G01S 7/352
See application file for complete search history.

(56) References Cited

U.S. PATENT DOCUMENTS 10,641,881 B2 * 5/2020 Searcy .................... G01S 7/032
2006/0097906 A1 * 5/2006 Heide ..................... G01S 7/032 342/22
2019/0178983 A1 6/2019 Lin et al.
2019/0273502 A1 * 9/2019 Khalid .................... G01S 7/032
2019/0293784 A1 * 9/2019 Khalid .................. G01S 13/584
2019/0386810 A1 * 12/2019 Barrilado Gonzalez .................... G06F 9/30087
2020/0025899 A1 * 1/2020 Starzer .................... G01S 13/87
2020/0386854 A1 * 12/2020 Melzer .................... G01S 7/032

FOREIGN PATENT DOCUMENTS

DE 102020121978 A1 2/2022

OTHER PUBLICATIONS

Och, Andreas, et al., “A Scalable 77 GHz Massive MIMO FMCW Radar by Cascading Fully-Integrated Transceivers,” Proceedings of 2018 Asia-Pacific Microwave Conference, S. 1235-1237.

* cited by examiner

*Primary Examiner* — Nazra Nur Waheed
(74) *Attorney, Agent, or Firm* — Harrity & Harrity, LLP

(57) ABSTRACT

The present disclosure relates to a cascaded radar system. The cascaded radar system includes a primary MMIC and a secondary MMIC coupled to the primary MMIC via a signal channel. The primary MMIC is configured to combine a LO signal with at least a second signal to generate a combined LO signal and to transmit the combined LO signal to the secondary MMIC via the signal channel. The secondary MMIC is configured to receive the combined LO signal via the signal channel, separate the LO signal and at least the second signal from the combined LO signal, and perform radar operations based on the LO signal and at least the second signal.

18 Claims, 4 Drawing Sheets

CASCADED RADAR SYSTEM

CROSS-REFERENCE TO RELATED APPLICATION

This application claims priority to German Patent Application No. 102023102699.2 filed on Feb. 3, 2023, the content of which is incorporated by reference herein in its entirety.

TECHNICAL FIELD

The present disclosure relates to radar systems and, more particularly, to radar concepts using signal processing techniques distributed among a plurality of integrated radar circuits.

BACKGROUND

Automotive radars, along with other environmental sensors such as lidar, ultrasound, and cameras, are one of the backbones of self-driving cars and advanced driver assistant systems (ADASs). These technological advancements are enabled by complex systems with signal processing paths from radars/sensors to one or more controllers. Automotive radar systems enable the detection of objects and obstacles, their position, and speed relative to a vehicle. The development of signal processing techniques along with progress in the millimeter-wave (mm-wave) semiconductor technology plays a key role in automotive radar systems. Various signal processing techniques have been developed to provide better resolution and estimation performance in all measurement dimensions: range, azimuth-elevation angles, and velocity of the targets surrounding the vehicles.

For frequency-modulated continuous-wave (FMCW) radar systems, for example, it is known to obtain information on range, speed, and spatial information by performing multiple Fast Fourier Transforms (FFTs) on samples of radar mixer outputs. A first FFT, also commonly referred to as range FFT, yields range information. A second FFT across the range transformed samples, also commonly referred to as Doppler FFT, yields speed information. The first and second FFTs yield a so-called 2D range-Doppler map comprising range and speed (FFT) bins, also referred to as range-Doppler cells. A third FFT involving phase information of signals of different antenna elements of an antenna array can yield additional spatial or angular information.

Since automated driving is continuously increasing, also requirements for angular resolution, azimuth but also elevation, are continuously increasing. This means that the number of transmit and receive channels in a radar system continuously increase. On the other side, the number of radio frequency (RF) channels on a radar Monolithic Microwave Integrated Circuit (MMIC) is limited by the power dissipation and by the number of pins. Thus, automotive radars may combine or cascade more and more MMIC devices to handle increasing numbers of transmit (Tx) and/or receive (Rx) channels.

Thus, there is a demand for improved signal distribution concepts when using multiple cascaded MMIC devices in a radar system.

SUMMARY

This demand is met by cascaded radar systems, MMICs, and methods in accordance with the independent claims. Further beneficial implementations are addressed by the dependent claims.

According to a first aspect of the present disclosure, it is proposed a cascaded radar system including a primary MMIC and at least one secondary MMIC coupled to the primary MMIC via a signal channel. The primary MMIC is configured to combine a local oscillator (LO) signal with at least a second signal to generate a combined LO signal and to transmit the combined LO signal to the secondary MMIC via the signal channel. The secondary MMIC is configured to receive the combined LO signal via the signal channel, to separate the LO signal and at least the second signal from the combined LO signal, and to perform radar operations based on the LO signal and at least the second signal.

Implementations of the present disclosure allow to distribute a plurality of signals (LO signal, at least one second signal) from the primary MMIC to at least one secondary MMIC over one common signal channel instead of dedicated signal channels for each signal. This may simplify signal routing and synchronization across a printed circuit board (PCB) carrying the MMICs.

In some implementations, the signal channel between the primary MMIC and the secondary MMIC consists of a PCB signal trace or a waveguide. This means that the LO signal and at least one second signal may be delivered from the primary MMIC to the at least one secondary MMIC using a single PCB signal trace or a single waveguide instead of using dedicated PCB signal traces or waveguides for each signal.

In some implementations, the LO signal is a frequency modulated signal whereas the second signal is not frequency modulated. For example, the LO signal distributed from the primary MMIC to the at least one secondary MMIC may be a FMCW signal. The second signal may include a binary clock and/or a trigger signal, for example. As such, the FMCW LO signal and the binary clock or trigger signal may be delivered from the primary MMIC to the at least one secondary MMIC using a single signal channel.

In some implementations, the second signal is a binary clock signal oscillating between a high and a low state. Due to frequency modulation of the LO signal (FMCW signal), a number of oscillations of the LO signal within a clock period of the clock signal may constantly increase or constantly decrease within a ramp time interval of a LO frequency modulation (frequency ramp). The binary clock signal may be used to synchronize signal processing among the various MMICs, for example.

In some implementations, the primary MMIC is configured to modulate the LO signal with at least the second signal to obtain a modulated LO signal, and transmit the modulated LO signal to the secondary MMIC via the signal channel. The secondary MMIC is configured to demodulate the modulated LO signal to obtain the LO signal and at least the second signal for performing the radar operations. That is, the combination of the LO signal with the at least one second signal may correspond a modulation of the LO signal (FMCW signal) with the at least one second signal. The second signal may thus vary one or more properties of the LO signal. The LO signal may be used as a carrier for the at least one second signal (modulation signal).

In some implementations, the primary MMIC is configured to modulate the LO signal with the at least one second signal in accordance with at least one of an amplitude-shift keying (ASK), frequency shift keying (FSK), or phase shift keying (PSK) scheme. Especially ASK may be useful for modulating an FMCW LO signal. In case of binary modulation signals, also the ASK may be binary.

In some implementations, the primary MMIC is configured to modulate the LO signal with a binary clock signal and with a further binary signal, and transmit the modulated LO signal to the secondary MMIC via the signal channel. That is, the LO signal may be used as carrier for two binary signals. The single signal channel then carries three signals from the primary MMIC to the secondary MMIC. The skilled person having benefit from the present disclosure will appreciate that the concept proposed herein is not limited to one or two modulation signals and can be extended to an arbitrary number of modulation signals which can be separated individually from each other and from the LO signal.

In some implementations, the primary MMIC is configured to modulate the LO signal with the binary clock signal according to a binary ASK scheme, and to add the further binary signal as a DC offset. A frequency or rate of the further binary signal may be lower than frequency/rate of the binary clock signal. In some implementations, the further binary signal may be a trigger signal for triggering the start of a FMCW frequency ramp. Thus, a frequency/rate of the further binary signal may correspond to a rate of FMCW frequency ramps.

In some implementations, the secondary MMIC is configured to separate the further binary signal from the modulated LO signal, re-generate the LO signal from the modulated LO signal, and demodulate the binary clock signal from the modulated LO signal using the re-generated LO signal.

In some implementations, the primary MMIC is configured to modulate the second signal with a third signal to generate a modulated second signal, and modulate the LO signal with the modulated second signal to generate the combined LO signal. That is, a two-stage modulation may be employed. In the first stage, the second signal is modulated with the third signal. In the second stage, the modulated second signal is used to modulate the LO signal. Then the modulated LO signal is transmitted from the primary MMIC to the secondary MMIC via the single signal channel.

According to a further aspect of the present disclosure, it is proposed a primary MMIC for a cascaded radar system including the primary MMIC and at least one secondary MMIC coupled to the primary MMIC via a signal channel. The primary MMIC is configured to combine a local oscillator (LO) signal with at least a second signal to generate a combined LO signal and to transmit the combined LO signal to the secondary MMIC via the signal channel. The primary MMIC is configured to receive the combined LO signal via the signal channel, to separate the LO signal and at least the second signal from the combined LO signal, and to perform radar operations based on the LO signal and at least the second signal.

According to a further aspect of the present disclosure, it is proposed an MMIC for a cascaded radar system. The MMIC includes an LO circuit configured to generate a LO signal, a combiner circuit configured to combine the LO signal with at least one second signal to obtain a combined LO signal, and an interface configured to transmit the combined LO signal to a further MMIC via a signal channel. Thus, the MMIC may act as the primary MMIC of a cascaded radar system.

In some implementations, the LO signal is a FMCW signal and may thus vary up and/or down in frequency over a fixed period of time (FMCW frequency ramp). That is, the combiner circuit may be configured to modulate the FMCW LO signal with the at least one second signal on top of the frequency modulation.

In some implementations, the combiner circuit is configured to modulate the LO signal with a binary clock signal and with a further binary signal. The further binary signal may be a FMCW ramp start signal, for example.

In some implementations, the modulator circuit is configured to modulate the LO signal with at least the second signal in accordance with at least one of an ASK-, FSK-, or PSK-modulation scheme.

In some implementations, the MMIC is further configured to activate an interface configured to receive, from a further MMIC, a combined LO signal including an LO signal combined with at least a second signal, activate a separator circuit configured to separate the LO signal and at least one second signal from the combined LO signal, and activate a radar processing circuit configured to perform radar processing based on the LO signal and at least the second signal. Thus, a primary MMIC may be reconfigured to become a secondary MMIC According to yet a further aspect of the present disclosure, it is proposed an MMIC for a cascaded radar system. The MMIC includes an interface configured to receive, from a further MMIC and via a signal channel, a combined LO signal including an LO signal combined with at least one second signal. The MMIC further includes a separator circuit configured to separate the LO signal and at least the second signal from the combined LO signal. The MMIC further includes a radar processing circuit configured to perform radar processing based on the LO signal and the second signal. Thus, the MMIC may act as the secondary MMIC.

In some implementations, the separator circuit may be configured to regenerate the LO signal from the combined LO signal, and to separate the second signal from the combined LO signal using the regenerated LO signal.

In some implementations, the second signal includes a clock signal for analog to digital converters (ADCs) and/or other digital blocks of the radar processing circuit and/or a FMCW ramp start signal for triggering a start of an FMCW ramp.

In some implementations, the MMIC is configured to activate an LO generator circuit to generate a LO signal, activate a combiner circuit to combine the LO signal with at least a second signal to obtain a combined LO signal, and activate an interface to transmit the combined LO signal to a further MMIC. Thus, a secondary MMIC may be reconfigured to become a primary MMIC.

According to yet a further aspect of the present disclosure, it is proposed a method for a cascaded radar system. The method includes transmitting a LO signal combined with at least a second signal from a primary MMIC to a secondary MMIC via a signal channel, and performing radar operations based on the LO signal and at least the second signal at the secondary MMIC.

In some implementations, the method further includes modulating, in the primary MMIC, the LO signal with at least the second signal to obtain a modulated LO signal in accordance with at least one of an ASK-, FSK-, or PSK-scheme.

In some implementations, the method includes modulating, in the primary MMIC, the LO signal with a binary clock signal and with a binary FMCW ramp start signal to obtain a modulated LO signal.

In some implementations, the method includes, in the secondary MMIC, separating the LO signal and at least the second signal from the combined LO signal. Separating may include regenerating the LO signal from the combined LO signal, demodulating the second signal from the combined LO signal using the re-generated LO signal, and performing radar processing based on the regenerated LO signal and the second signal.

BRIEF DESCRIPTION OF THE DRAWINGS

Some examples of apparatuses and/or methods will be described in the following by way of example only, and with reference to the accompanying figures, in which FIG. 1 schematically shows a cascaded radar system comprising a primary MMIC and a secondary MMIC coupled to the primary MMIC via a signal channel.

DETAILED DESCRIPTION

Figure 1:
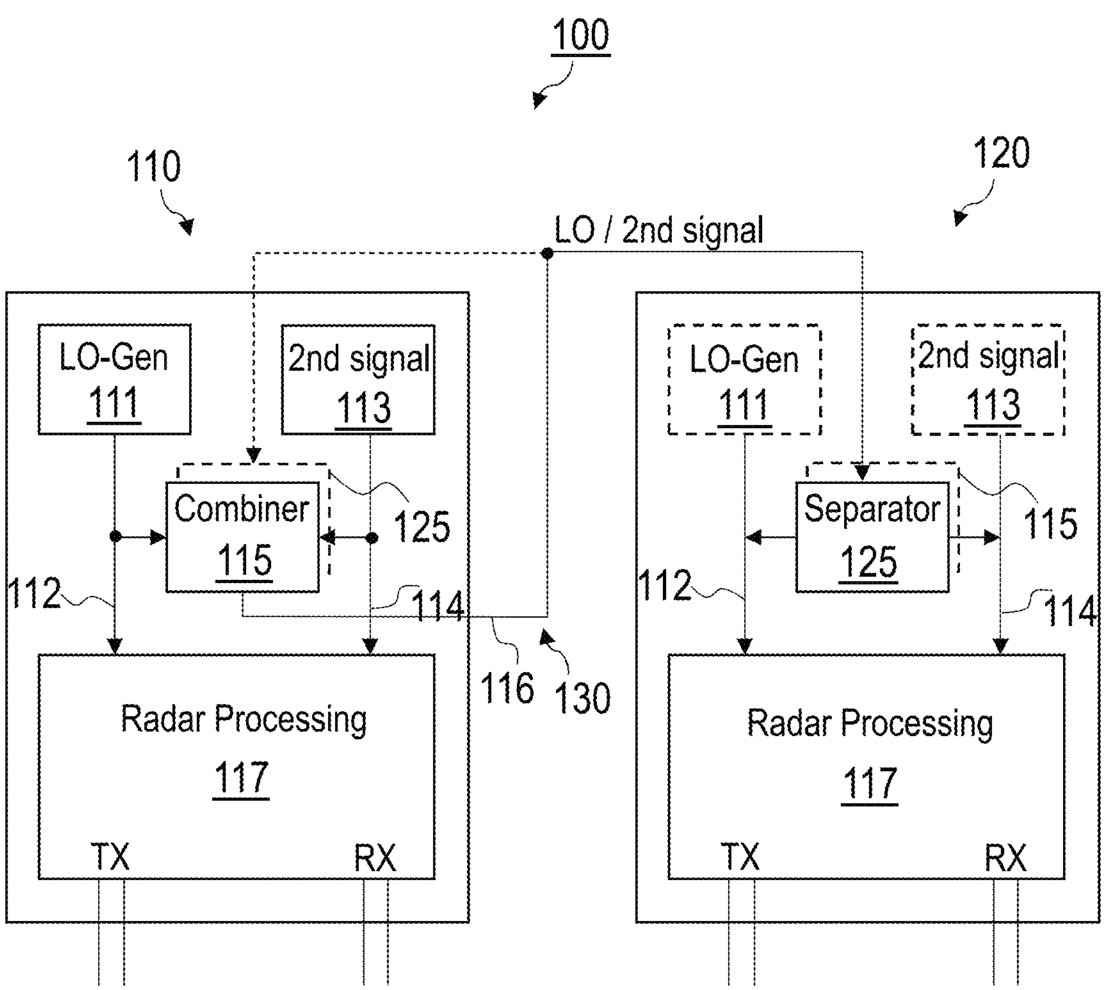

Some examples are now described in more detail with reference to the enclosed figures. However, other possible examples are not limited to the features of these implementations described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an "or", this is to be understood as disclosing all possible combinations, e.g., only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

FIG. 1 shows a schematic block diagram of a cascaded radar system 100 in accordance with implementations the present disclosure.

Cascaded radar system 100 comprises a plurality of radar MMICs 110, 120 mounted on a PCB. For simplicity, only two radar MMICs 110, 120 are illustrated. The skilled person having benefit from the present disclosure will appreciate, however, that there can be more than two radar MMICs in the system 100. The radar MMICs 110, 120 can be cascaded for transmit (Tx) and/or receive (Rx) radar operations, such as Tx/Rx beamforming and/or cooperative FFT signal processing, for example. In cascaded radar system 100, one radar MMIC may be configured as primary MMIC 110, while one or more other MMICs 120 may be configured as secondary(s).

During operation, primary MMIC 110 may generate and/or distribute a plurality of signals to the one or more secondary MMICs 120, and optionally back to itself. For example, in a cascaded operation, a secondary MMIC 120 may receive a local oscillator (LO) signal from the primary MMIC 110. This may enable a synchronized LO signal for all MMICs in the system 100. Synchronization of the MMICs and their signals is an increasing challenge. For example, the following signals should remain in synchronization between all MMICs: LO signal (e.g., 40 or 80 GHz), digital clock for ADCs (e.g., 200 MHz), and ramp start/TRIG.

Routing three signal trees or channels, one for each signal, with equal delays across the PCB with multiple MMICs can be challenging. Further, the number of I/O (pins) may get prohibitive for cheap packages. Therefore, the present disclosure proposes routing more than one signal via one common signal channel from the primary MMIC 110 to the secondary MMIC 120. In particular, the present disclosure proposes to route the LO signal plus at least one additional signal via one common signal channel from the primary MMIC 110 to the secondary MMIC 120.

The cascaded radar system 100 according to implementations of the present disclosure thus comprises a primary MMIC 110 and at least one secondary MMIC 120 coupled to the primary MMIC 110 via a signal channel 130. The signal channel 130 may be a wireless or wired signal channel. In the latter case, signal channel 130 may be understood as a signal line, such as a PCB signal trace between the primary MMIC 110 and the secondary MMIC 120. In other examples, signal channel 130 could also be a waveguide between the primary MMIC 110 and the secondary MMIC 120.

The primary MMIC 110 may comprise an LO circuit 111 which is configured to generate a LO signal 112 to be used at the primary MMIC 110 and also to be distributed to secondary MMIC 120. For example, the local oscillator circuit 111 may comprise a voltage-controlled oscillator (VCO) configured to generate a frequency-modulated continuous wave (FMCW) signal as LO signal 112. There are several possible frequency modulation patterns for the FMCW LO signal 112 which can be used for different radar measurement purposes, such as sawtooth modulation, triangular modulation, square-wave modulation, stepped modulation (staircase voltage), or sinusoidal modulation.

The primary MMIC 110 also comprises a combiner circuit 115 which is configured to combine the LO signal 112 with at least one second signal 114 to obtain a combined LO signal 116 at the output of combiner circuit 115. The combined LO signal 116 including the LO signal 112 and the second signal 114 may then be transmitted to the secondary MMIC 120 via the signal channel 130. That is, signal channel 130 is used for conveying both signals at the same time from the primary MMIC 110 to the secondary MMIC 120. The LO signal 112 and the second signal 114 may be combined to the combined LO signal 116 in various ways. Examples of signal combinations are summation, subtraction, division, multiplication, or combinations thereof.

While the LO signal 112 may be a FMCW signal, the second signal 114 may be a non-frequency modulated signal. A frequency/rate of the second signal 114 may be lower than that of the LO signal 112. The second signal 114 may be an information-bearing signal (e.g., a useful signal). In other examples, the second signal 114 may be a control signal, such as a clock signal or a trigger signal. A clock signal oscillates between a high and a low state and is used like a metronome to coordinate actions of digital circuits, such as ADCs, DACs, or digital processors of the MMICs 110, 120, for example. In the case of a FMCW signal as LO signal 112, a number of oscillations of the LO signal 112 within a clock period of the clock signal may constantly increase and/or constantly decrease within a FMCW ramp time interval. An example of a trigger signal is a signal that triggers a start of a FMCW frequency ramp. A frequency/rate of a trigger signal may be lower than that of a clock signal. Like a clock signal, a trigger signal may also be binary. Thus, the second signal 114 (modulation signal) may be binary signal. However, also M-ary (M>2) signals are conceivable as second signal 114 (modulation signal).

The secondary MMIC 120 of cascaded radar system 100 comprises a signal interface which is configured to receive the combined LO signal 116 including LO signal 112 combined with the at least one second signal 114. The combined LO signal 116 is fed to a separator circuit 125 of the secondary MMIC 120. The separator circuit 125 of secondary MMIC 120 is configured to separate the LO signal 112 and the at least one second signal 114 from the combined LO signal 116. Then, both the LO signal 112 and the second signal 114 can be used by radar processing circuit 117 of secondary MMIC 120 for performing radar operations (e.g., Tx- and/or Rx processing). Thus, the radar operations of primary MMIC 110 and secondary MMIC 120 may be synchronized.

As the primary MMIC 110 may be reconfigured as secondary MMIC and the secondary MMIC 120 may be reconfigured as primary MMIC, both the primary MMIC 110 and the secondary MMIC 120 may both comprise identical circuit components some of which may be enabled or disabled depending on the configuration as primary or secondary MMIC. That is, both MMICs may comprise a respective combiner circuit 115 and a respective separator circuit 125. This is indicated by dashed lines/blocks in FIG. 1. Depending on the configuration as primary or secondary MMIC some of the circuit blocks may be functional or disabled.

The combiner circuit 115 of primary MMIC 110 may be configured as a modulator circuit. Modulator circuit 115 may be configured to modulate the LO signal 112 with the at least one second signal 114 to obtain a modulated LO signal as combined LO signal 116. Primary MMIC 110 may then transmit the modulated LO signal 116 to secondary MMIC 120 via the common signal channel 130. Modulator circuit 115 may be configured to modulate the LO signal 112 with the at least one second signal 114 in accordance with at least one of an amplitude modulation, a frequency modulation, or a phase modulation scheme. The skilled person having benefit form the present disclosure will appreciate that the modulation scheme may depend on the nature of the LO signal 112 and the at least one second signal 114. In case of a FMCW signal as LO signal 112 and a binary second signal, an amplitude modulation scheme, such as ASK, for example, may be well suited as modulation scheme.

Likewise, the separator circuit 125 of the secondary MMIC 120 may be configured as a demodulator circuit to undo the modulation of the primary MMIC 110. The demodulator circuit 125 may be configured to regenerate the LO signal 112 from the modulated LO signal 116 and to demodulate the second signal 114 from the modulated LO signal 116 using the regenerated LO signal 112. In the example case of amplitude modulation, the demodulator circuit 125 may comprise a limiter to regenerate the LO signal 112 from the modulated LO signal 116, for example. A limiter is a circuit that allows signals below a specified input power or level to pass unaffected while attenuating (lowering) the peaks of stronger signals that exceed this threshold. The regenerated LO signal 112 may then be mixed with the modulated LO signal 116 to obtain the second signal 114. Both the regenerated LO signal 112 and the second signal 114 may then be used for radar operations at the secondary MMIC 120 synchronized with radar operations at further secondary MMICs (not shown) which are configured the same way and coupled to the primary MMIC 110 via the common signal channel 130.

The primary MMIC 110 may also feed the modulated LO signal 116 back to itself via the common signal channel 130 and regenerate the LO signal 112 from the modulated LO signal 116 and demodulate the second signal 114 from the modulated LO signal 116 using the regenerated LO signal 112. Thus, the primary MMIC 110 may be configured to receive the combined LO signal 116 via the signal channel 130, to separate the LO signal 112 and at least the second signal 114 from the combined LO signal 116, and to perform radar operations based on the LO signal 112 and at least the second signal 114. In this way, good synchronization between all MMICs may be achieved.

Figure 2:
FIG. 2 shows a primary MMIC with modulation circuitry coupled to a secondary MMIC with demodulation circuitry via a PCB trace.
Figure 2:
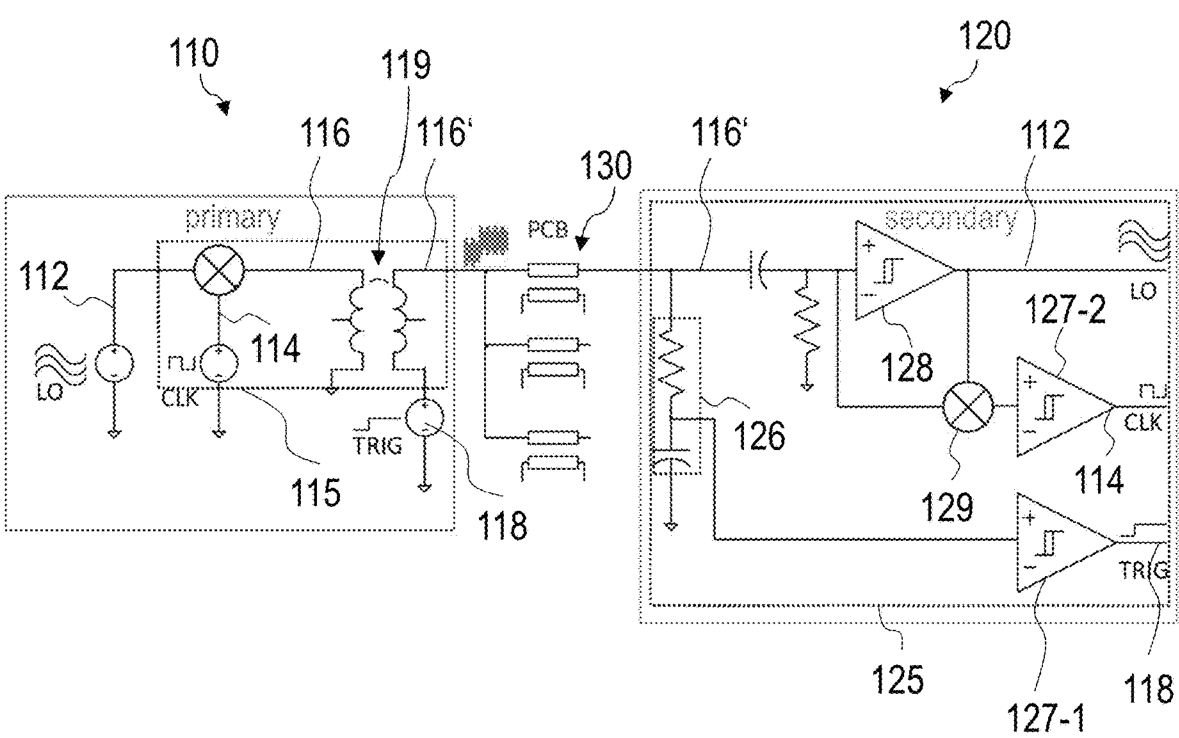

Turning now to FIG. 2, example implementations of the combiner circuit 115 of primary MMIC 110 and separator circuit 125 of secondary MMIC 120 are shown.

Figure 3:
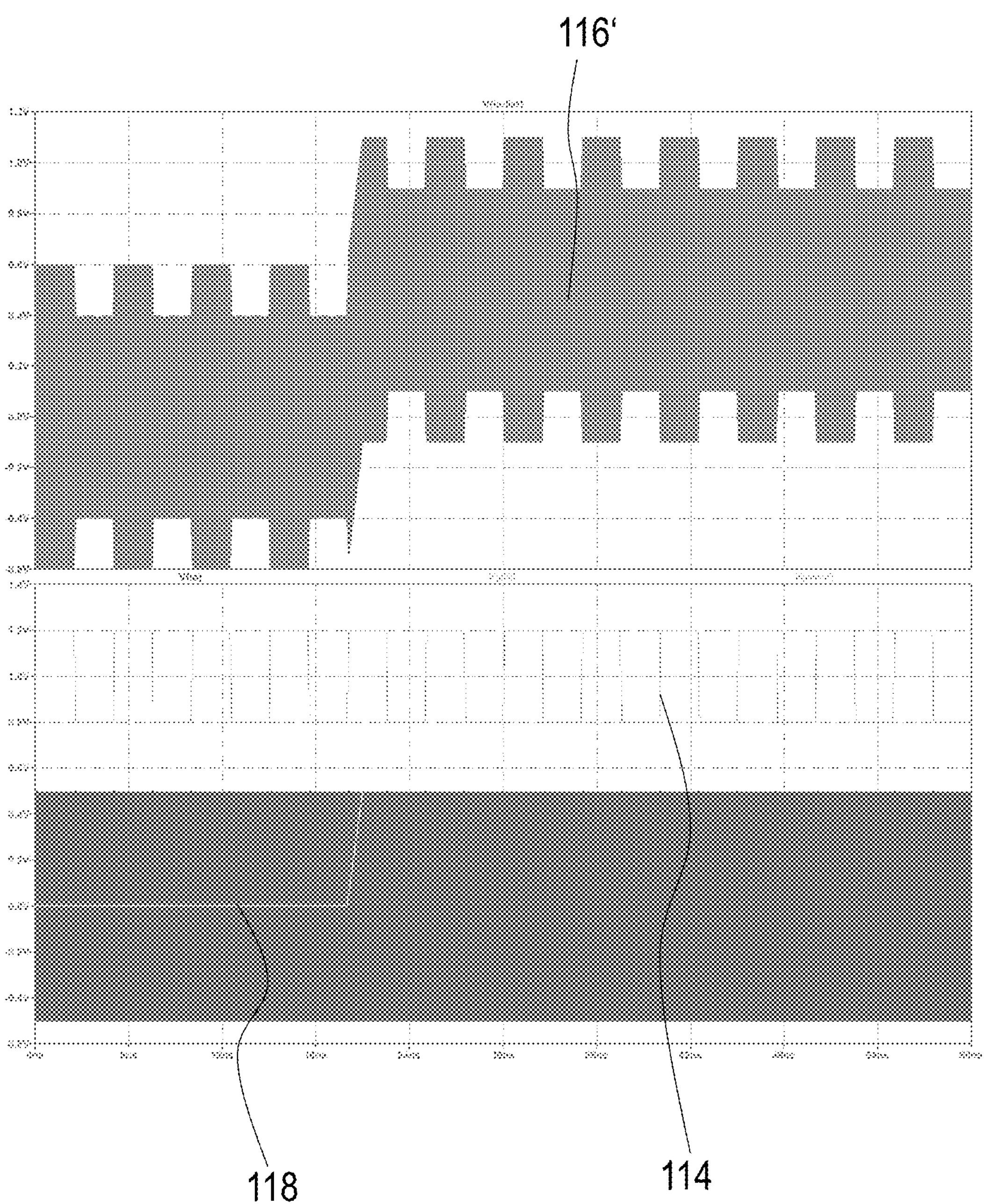
FIG. 3 shows examples of a clock signal, a FMCW ramp trigger signal, and an LO signal modulated with the clock signal and the FMCW ramp trigger signal.

Combiner circuit 115 of primary MMIC 110 receives a FMCW LO signal 112 from a VCO as a first input signal, a binary clock signal 114 from a clock generation circuit as second input signal, and a binary FMCW ramp start trigger signal 118 from a trigger signal generation circuit as third input signal. Combiner circuit 115 of FIG. 3 is configured to modulate the amplitude of the FMCW LO signal 112 according to the binary clock signal 114 to obtain a modulated LO signal 116. If the binary clock signal 114 is "high" this may translate to a high amplitude of the modulated LO signal 116, if the binary clock signal 114 is "low" this may translate to a low amplitude of the modulated LO signal 116.

In a second stage of the modulation, the modulated LO signal 116 is further modulated with the binary FMCW ramp start trigger signal 118 in that a DC offset for the modulated LO signal 116 is generated in accordance with the binary FMCW ramp start trigger signal 118. For example, if the binary FMCW ramp start trigger signal 118 is "high" this may translate to DC-offset in the modulated LO signal 116, if the binary FMCW ramp start trigger signal 118 is "low" this may translate to no DC-offset in the modulated LO signal 116. Circuits to generate DC-offsets are numerous. For example, a (transformer) balun 119 may be used to translate the FMCW ramp start trigger signal 118 into a DC-offset of two-stage modulated output signal 116'. Other circuit options for DC-offset generation include circuits with operational amplifiers (OP amps), adders, or switched voltage dividers, for example.

In FIG. 2, the blocks shown in secondary MMIC 120 can be in the primary MMIC, which may also be reconfigured as a secondary MMIC. Likewise, the blocks shown in primary MMIC 110 can be in the secondary MMIC, which may also be reconfigured as primary MMIC.

Examples of a binary clock signal 114, a binary FMCW ramp start trigger signal 118, and a two-stage modulated LO signal 116' are shown in FIG. 3. It can be seen that the two-stage modulated LO signal 116' has a binary ASK component in accordance with the clock signal 114 and a DC-offset in accordance with the FMCW ramp start trigger signal 118.

The two-stage modulated LO signal 116' modulated with clock signal 114 as well as with FMCW ramp start trigger signal 118 is then transmitted from primary MMIC 110 to secondary MMIC 120 via a single PCB signal trace 130. The skilled person having benefit from the present disclosure will appreciate that further PCB signal traces 130 may be foreseen to transmit the two-stage modulated LO signal 116' from primary MMIC 110 to respective further secondary MMICs. At the secondary MMIC 120, the FMCW ramp start trigger signal 118 may be separated from the received modulated LO signal 116' by feeding the modulated LO signal 116' through an analog low pass filter 126, for example. The low pass filter 126 may eliminate the high-frequency LO signal 112 and output the lower-frequency FMCW ramp start trigger signal 118. Signal quality of the FMCW ramp start trigger signal 118 may be further improved by feeding the output of low pass filter 126 to a comparator 127-1.

Further, at the secondary MMIC 120, the LO signal 112 may be regenerated from the received two-stage modulated LO signal 116' by feeding the two-stage modulated LO signal 116' to a limiter 128 to obtain the LO signal 112 at its output. The regenerated LO signal 112 may then be mixed with the two-stage modulated LO signal 116' to obtain the clock signal 114 at the output of mixer 129. Signal quality of the clock signal 114 may be further improved by feeding the output of mixer 129 to a comparator 127-2. Prior to mixing and/or limiting, two-stage modulated LO signal 116' may be low-pass filtered to cancel the FMCW ramp start trigger signal 118 from the two-stage modulated LO signal 116'. For example, a low pass filter may be coupled between an input pin for PCB signal trace 130 and limiter 128/mixer 129.

In this way, all three signals 112, 114, 118 may be regenerated at the secondary MMIC(s) 120 and used for performing synchronized radar operations at the primary MMC 110 and the secondary MMIC(s) 120.

The person having benefit from the present disclosure will appreciate that the MMICs 110, 120 may have identical hardware components. Primary MMIC 110 may thus also comprise separator or demodulator circuit 125. Likewise, secondary MMIC 120 may also comprise local oscillator circuit 111, clock generator circuit 113, and combiner or modulator circuit 115. Secondary MMIC 120 may, if necessary, be reconfigured to become primary MMIC 110, and vice versa. Thus, secondary MMIC 120 may be reconfigured as primary and thus activate a local oscillator circuit 111 to generate a LO signal 112, a modulator circuit 115 configured to modulate the LO signal 112 with at least a second signal 114 to obtain a modulated LO signal 116, and an interface configured to transmit the modulated LO signal 116 to a further MMIC. Primary MMIC 110 may be reconfigured as secondary and thus activate a demodulator circuit 125 configured to regenerate the LO signal 112 from the modulated LO signal 116, and demodulate the second signal 114 from the modulated LO signal 116 using the regenerated LO signal 112. The primary MMIC 110 or secondary MMIC 120 may be reconfigured to operate both as a primary and a secondary MMIC and thus activate a local oscillator circuit 111, a modulator circuit 115, a demodulator circuit 125, an interface to transmit the modulated LO signal 116, and an interface to receive the modulated LO signal 116.

Figure 4:
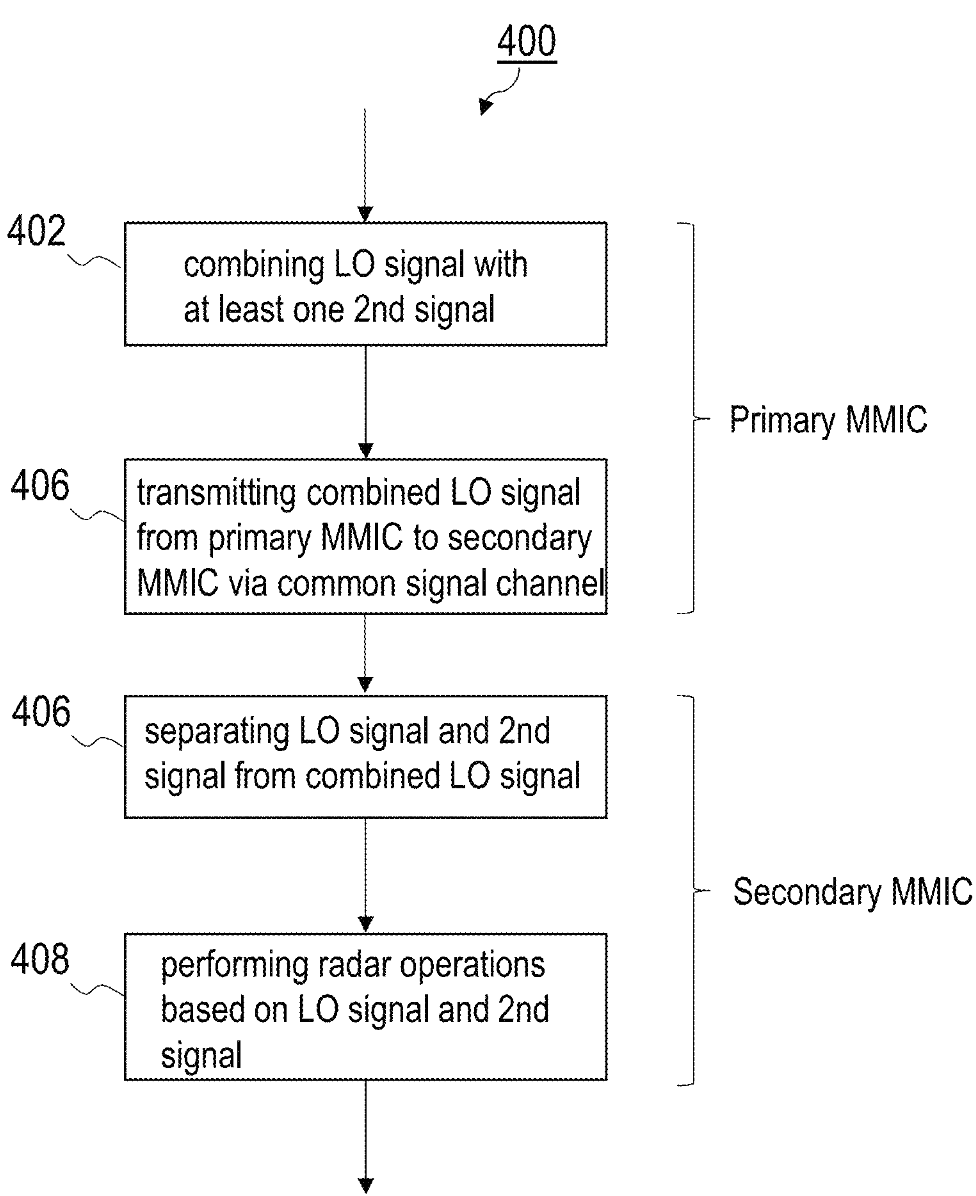
FIG. 4 a flowchart of a method for a cascaded radar system in accordance with implementations of the present implementation.

To summarize the proposed concept, FIG. 4 illustrates a flowchart of a signal distribution method 400 for cascaded radar system 100.

At primary MMIC 110, method 400 includes an act 402 of combining an LO signal 112 with at least one second signal 114 to generate a combined LO signal 116. At primary MMIC 110, method 400 includes an act 404 of transmitting the combined LO signal 116 from primary MMIC 110 to a secondary MMIC 120 via one signal channel 130. At secondary MMIC 120, method 400 includes an act 406 of separating the LO signal 112 and the second signal 114 from the received combined LO signal 116. Then, at 408, radar operations may be performed synchronously at both MMICs 110, 120 based on the LO signal 112 and the second signal 114.

The signals 112, 114, 118 provided together via the signal channel 130 may allow for inherent synchronization and may omit challenging circuitry on chip. The proposed concept may be robust to external interference and may allow for reduced package size due to less required balls (I/O pins).

As has been explained before, in FIG. 4, acts 406 and 408 can be performed by either a primary or a secondary MMIC.

The aspects and features described in relation to a particular one of the previous examples may also be combined with one or more of the further examples to replace an identical or similar feature of that further example or to additionally introduce the features into the further example.

It is further understood that the disclosure of several steps, processes, operations or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process or operation may include and/or be broken up into several sub-steps, -functions, -processes or operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

ASPECTS

The following provides an overview of some Aspects of the present disclosure:

Aspect 1: A cascaded radar system, comprising: a primary monolithic microwave integrated circuit (MMIC); a secondary MMIC coupled to the primary MMIC via a signal channel; wherein the primary MMIC is configured to: combine a local oscillator (LO) signal with at least a second signal to generate a combined LO signal; transmit the combined LO signal to the secondary MMIC via the signal channel; wherein the secondary MMIC is configured to: receive the combined LO signal via the signal channel, separate the LO signal and at least the second signal from the combined LO signal; and perform radar operations based on the LO signal and at least the second signal.

Aspect 2: The cascaded radar system of Aspect 1, wherein the signal channel comprises a printed circuit board (PCB) trace, or a waveguide.

Aspect 3: The cascaded radar system of any of Aspects 1-2, wherein the LO signal is a frequency modulated signal and the second signal is not frequency modulated.

Aspect 4: The cascaded radar system of any of Aspects 1-3, wherein the second signal is a clock signal, and wherein a number of oscillations of the LO signal within a clock period of the clock signal constantly increases or constantly decreases within a ramp time interval of a LO frequency modulation.

Aspect 5: The cascaded radar system of any of Aspects 1-4, wherein the primary MMIC is configured to: modulate the LO signal with at least the second signal to obtain a modulated LO signal, and transmit the modulated LO signal to the secondary MMIC via the signal channel, and wherein the secondary MMIC is configured to: demodulate the modulated LO signal to obtain the LO signal and at least the second signal for performing the radar operations.

Aspect 6: The cascaded radar system of Aspect 5, wherein the primary MMIC is configured to modulate the LO signal with at least the second signal in accordance with at least one of an amplitude-shift keying scheme, a frequency shift keying scheme, or a phase shift keying scheme.

Aspect 7: The cascaded radar system of Aspect 5, wherein the primary MMIC is configured to: modulate the LO signal with a binary clock signal and with a second binary signal, and transmit the modulated LO signal to the secondary MMIC via the signal channel.

Aspect 8: The cascaded radar system of Aspect 7, wherein the primary MMIC is configured to: modulate the LO signal with the binary clock signal according to an amplitude-shift keying scheme, and add the second binary signal as a DC offset.

Aspect 9: The cascaded radar system of Aspect 7, wherein the secondary MMIC is configured to: separate the second binary signal from the modulated LO signal, re-generate the LO signal from the modulated LO signal to obtain a re-generated LO signal, and demodulate the binary clock signal from the modulated LO signal using the re-generated LO signal.

Aspect 10: The cascaded radar system of Aspect 5, wherein the primary MMIC is configured to: modulate the second signal with a third signal to generate a modulated second signal, and modulate the modulated second signal with the LO signal to generate the combined LO signal.

Aspect 11: A monolithic microwave integrated circuit (MMIC) for a cascaded radar system, the MMIC comprising: a local oscillator (LO) circuit configured to generate a LO signal; a combiner circuit configured to combine the LO signal with at least a second signal to obtain a combined LO signal; and an interface configured to transmit the combined LO signal to a further MMIC.

Aspect 12: The MMIC of Aspect 11, wherein the LO signal is a frequency-modulated continuous-wave (FMCW) signal.

Aspect 13: The MMIC of any of Aspects 11-12, wherein the combiner circuit is configured to modulate the LO signal with a binary clock signal and with a second binary signal.

Aspect 14: The MMIC of Aspect 10, wherein the combiner circuit is configured to modulate the LO signal with at least the second signal in accordance with at least one of an amplitude-shift keying scheme, a frequency shift keying scheme, or a phase shift keying scheme.

Aspect 15: The MMIC of any of Aspects 11-14, wherein the MMIC is configured to activate an interface configured to receive, from a further MMIC, a combined LO signal comprising an LO signal combined with at least a second signal, wherein the MMIC is configured to activate a separator circuit configured to separate the LO signal and at least one second signal from the combined LO signal, and wherein the MMIC is configured to activate a radar processing circuit configured to perform radar processing based on the LO signal and at least the second signal.

Aspect 16: A monolithic microwave integrated circuit (MMIC) for a cascaded radar system, the MMIC comprising: an interface configured to receive a combined LO signal comprising an LO signal combined with at least a second signal; a separator circuit configured to separate the LO signal and at least the second signal from the combined LO signal; and a radar processing circuit configured to perform radar processing based on the LO signal and at least the second signal.

Aspect 17: The MMIC of Aspect 15, wherein the second signal comprises a clock signal for analog to digital converters (ADCs) of the radar processing circuit or for a frequency-modulated continuous-wave (FMCW) ramp start signal for triggering a start of an FMCW ramp.

Aspect 18: The MMIC of Aspect 15, wherein the MMIC is configured to activate a local oscillator circuit to generate a LO signal, wherein the MMIC is configured to activate a combiner circuit configured to combine the LO signal with at least a second signal to obtain a combined LO signal, and wherein the MMIC is configured to activate an interface configured to transmit the combined LO signal to a further MMIC.

Aspect 19: A system configured to perform one or more operations recited in one or more of Aspects 1-18.

Aspect 20: An apparatus comprising means for performing one or more operations recited in one or more of Aspects 1-18.

The invention claimed is:

1. A cascaded radar system, comprising:

a primary monolithic microwave integrated circuit (MMIC);

a secondary MMIC coupled to the primary MMIC via a signal channel;

wherein the primary MMIC is configured to:

combine a local oscillator (LO) signal with at least a second signal to generate a combined LO signal, and transmit the combined LO signal to the secondary MMIC via the signal channel; and wherein the secondary MMIC is configured to:

receive the combined LO signal via the signal channel, separate the LO signal and at least the second signal from the combined LO signal, wherein separating the LO signal from the combined LO signal comprises regenerating the LO signal from the combined LO signal, and wherein separating at least the second signal from the combined LO signal comprises demodulating, using the regenerated LO signal, at least the second signal from the combined LO signal; and perform radar operations based on the LO signal and at least the second signal.

2. The cascaded radar system of claim 1, wherein the signal channel comprises a printed circuit board (PCB) trace, or a waveguide.

3. The cascaded radar system of claim 1, wherein the LO signal is a frequency modulated signal and the second signal is not frequency modulated.

4. The cascaded radar system of claim 1, wherein the second signal is a clock signal, and wherein a number of oscillations of the LO signal within a clock period of the clock signal constantly increases or constantly decreases within a ramp time interval of a LO frequency modulation.

5. The cascaded radar system of claim 1, wherein the primary MMIC is configured to:

modulate the LO signal with at least the second signal to obtain a modulated LO signal, and transmit the modulated LO signal to the secondary MMIC via the signal channel, and wherein the secondary MMIC is configured to:

demodulate the modulated LO signal to obtain the LO signal and at least the second signal for performing the radar operations.

6. The cascaded radar system of claim 5, wherein the primary MMIC is configured to modulate the LO signal with at least the second signal in accordance with at least one of an amplitude-shift keying scheme, a frequency shift keying scheme, or a phase shift keying scheme.

7. The cascaded radar system of claim 5, wherein the primary MMIC is configured to:

modulate the LO signal with a binary clock signal and with a second binary signal, and transmit the modulated LO signal to the secondary MMIC via the signal channel.

8. The cascaded radar system of claim 7, wherein the primary MMIC is configured to:

modulate the LO signal with the binary clock signal according to an amplitude-shift keying scheme, and add the second binary signal as a DC offset.

9. The cascaded radar system of claim 7, wherein the secondary MMIC is configured to:

separate the second binary signal from the modulated LO signal, re-generate the LO signal from the modulated LO signal to obtain a re-generated LO signal, and demodulate the binary clock signal from the modulated LO signal using the re-generated LO signal.

10. The cascaded radar system of claim 5, wherein the primary MMIC is configured to:

modulate the second signal with a third signal to generate a modulated second signal, and modulate the modulated second signal with the LO signal to generate the combined LO signal.

11. A monolithic microwave integrated circuit (MMIC) for a cascaded radar system, the MMIC comprising:

a local oscillator (LO) circuit configured to generate a LO signal;

a combiner circuit configured to combine the LO signal with at least a second signal to obtain a combined LO signal; and an interface configured to transmit the combined LO signal to a further MMIC, the further MMIC to regenerate the LO signal from the combined LO signal and demodulate, using the regenerated LO signal, at least the second signal from the combined LO signal.

12. The MMIC of claim 11, wherein the LO signal is a frequency-modulated continuous-wave (FMCW) signal.

13. The MMIC of claim 11, wherein the combiner circuit is configured to modulate the LO signal with a binary clock signal and with a second binary signal.

14. The MMIC of claim 11, wherein the combiner circuit is configured to modulate the LO signal with at least the second signal in accordance with at least one of an amplitude-shift keying scheme, a frequency shift keying scheme, or a phase shift keying scheme.

15. The MMIC of claim 11, wherein the MMIC is configured to activate an interface configured to receive, from a further MMIC, a combined LO signal comprising an LO signal combined with at least a second signal, wherein the MMIC is configured to activate a separator circuit configured to separate the LO signal and at least one second signal from the combined LO signal, and wherein the MMIC is configured to activate a radar processing circuit configured to perform radar processing based on the LO signal and at least the second signal.

16. A monolithic microwave integrated circuit (MMIC) for a cascaded radar system, the MMIC comprising:

an interface configured to receive a combined local oscillator (LO) signal comprising an LO signal combined with at least a second signal;

a separator circuit configured to separate the LO signal and at least the second signal from the combined LO signal, wherein separating the LO signal from the combined LO signal comprises regenerating the LO signal from the combined LO signal, and wherein separating at least the second signal from the combined LO signal comprises demodulating, using the regenerated LO signal, at least the second signal from the combined LO signal; and a radar processing circuit configured to perform radar processing based on the LO signal and at least the second signal.

17. The MMIC of claim 16, wherein the second signal comprises a clock signal for analog to digital converters (ADCs) of the radar processing circuit or for a frequency-modulated continuous-wave (FMCW) ramp start signal for triggering a start of an FMCW ramp.

18. The MMIC of claim 16, wherein the MMIC is configured to activate a local oscillator circuit to generate a LO signal, wherein the MMIC is configured to activate a combiner circuit configured to combine the LO signal with at least a second signal to obtain a combined LO signal, and wherein the MMIC is configured to activate an interface configured to transmit the combined LO signal to a further MMIC.

* * * * *